(12) United States Patent
Dakhil

(10) Patent No.: US 6,341,318 B1
(45) Date of Patent: Jan. 22, 2002

(54) DMA DATA STREAMING

(75) Inventor: Dani Y. Dakhil, Campbell, CA (US)

(73) Assignee: Chameleon Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/371,461

(22) Filed: Aug. 10, 1999

(51) Int. Cl.[7] .............................................. G06F 13/28
(52) U.S. Cl. ........................... 710/23; 710/24; 710/53; 710/34
(58) Field of Search .............................. 710/22, 23, 24, 710/53, 33, 34

(56) References Cited

U.S. PATENT DOCUMENTS

| | | | | | |
|---|---|---|---|---|---|
| 4,956,768 A | * | 9/1990 | Sidi et al. | ...................... | 710/53 |
| 5,163,132 A | * | 11/1992 | DuLac et al. | .................. | 710/53 |
| 5,224,213 A | * | 6/1993 | Dieffenderfer et al. | ....... | 710/53 |
| 5,671,445 A | * | 9/1997 | Gluyas et al. | ................. | 710/53 |
| 5,790,893 A | * | 8/1998 | Polge et al. | ................... | 710/53 |
| 5,968,143 A | * | 10/1999 | Chisholm et al. | ............. | 710/23 |
| 6,185,640 B1 | * | 2/2001 | Ross | ........................... | 710/53 |

* cited by examiner

*Primary Examiner*—Hiep T. Nguyen
(74) *Attorney, Agent, or Firm*—Burns Doane Swecker & Mathis LLP

(57) ABSTRACT

A system and method of increasing the efficiency of a data processing system by alternately streaming portions of a large block of data from a large memory area into two memory banks within a smaller memory area using consecutive DMA transactions. Each streaming DMA transaction is entered in a DMA transaction queue and once it becomes active, transfers a block of data, the same size as one of the two memory banks, into one of the memory banks, after which it becomes inactive and is re-entered in the queue. When the streaming DMA transaction becomes active again, it switches to a different memory bank address and continues in the large data block where it stopped last time it was active. The streaming DMA transaction continues to be circulated in the queue until a total number of transaction iterations is reached, at which point the streaming DMA transaction is complete and is removed from the queue.

13 Claims, 4 Drawing Sheets

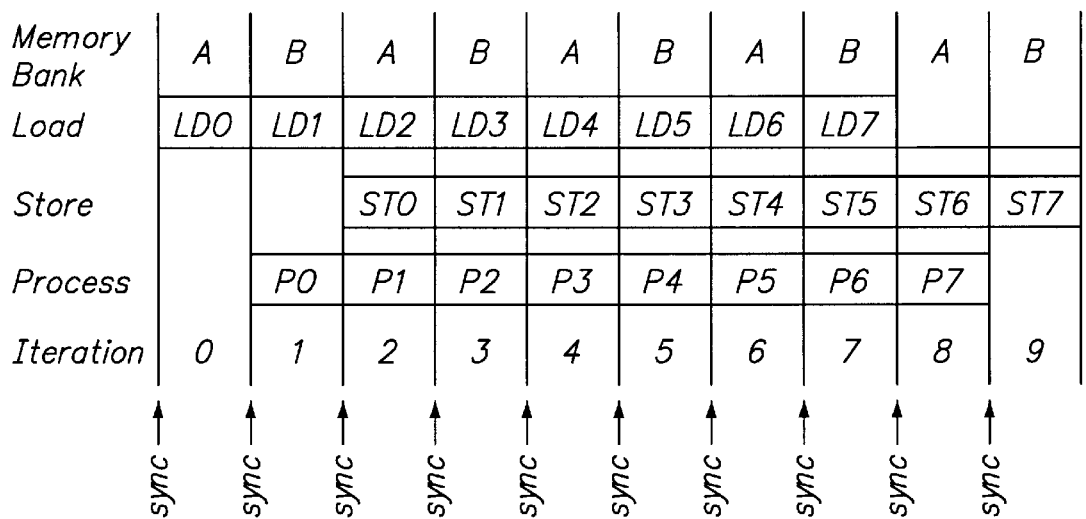

FIG. 2C

| Field | Bits | Description | Reset | Type |
|---|---|---|---|---|
| MEMADDR | 31:0 | DMA memory address | U | RW |

DMA Address In Memory
FIG. 3A

| Field | Bits | Description | Reset | Type |
|---|---|---|---|---|
| RESERVED | 31:30 | Reserved, Read as 0 | 0 | R |
| LSMBNK1 | 29:16 | Bank 1 Address (used in stream mode only) | U | RW |
| RESERVED | 15:14 | Reserved, Read as 0 | 0 | R |
| LSMADDR | 13:0 | DMA address (this field is used as LSMBNK0 address in stream mode) | U | RW |

DMA Address In
FIG. 3B

| Field | Bits | Description | Reset | Type |
|---|---|---|---|---|
| STREAM | 1 | Stream Mode. | 0 | RW |
| GO | 0 | GO bit. | 0 | RW |

Control/Status Register
FIG. 3C

| Field | Bits | Description | Reset | Type |
|---|---|---|---|---|
| RESERVED | 31:12 | Reserved, Read as 0 | 0 | R |
| STRMITR | 11:2 | Count of iterations between the two banks in streaming mode.[11]<br>(meaningless when STREM=0) | U | RW |
| STRMDMA | 1:0 | Streaming DMAs: The DMA register sets used to stream data<br>    Maximum of 2 DMA register sets can be used in this mode:<br>01: DMA register set 0<br>11: DMA register sets 0 & 1<br>(meaningless when STREM=0) | U | RW |

*Stream Control Register*

FIG. 3D

| Field | Bits | Description | Reset | Type |
|---|---|---|---|---|
| RESERVED | 31:13 | Reserved, Read as 0 | 0 | R |
| BNKSZ | 12:0 | Bank Size (in bytes) | U | RW |

*Bank Size*

FIG. 3E

| Field | Bits | Description | Reset | Type |
|---|---|---|---|---|
| RW | 0 | 1:DMA Read, 0:DMA Write, Undefined on reset. | U | RW |

*DMA Control/Status Register*

FIG. 3F

DMA DATA STREAMING

BACKGROUND OF THE INVENTION

1. Field of the Invention

The present invention relates to memory system management and usage in a data processing system, and particularly to reducing latencies associated with load and store memory operations in a data processing system.

2. State of the Art

The memory system of single chip integrated computer or processing system generally includes an on-chip memory portion and a larger off-chip external memory portion. In this case, the memory system is managed by storing a bulk of the digital information off-chip, loading portions of the off-chip information into the on-chip memory portion, processing the data in the on-chip memory portion, and then storing the data either back to the off-chip memory or outputting it to another destination.

One of the drawbacks of this technique occurs when the size of the block of data being transferred from external memory to the chip is larger than the area in which it is to be transferred. When this occurs, it is necessary to perform multiple load, process, and store transactions to process the oversized block of data.

For instance, FIG. 1A shows a typical prior art processing system 10 including a memory system 11 having an external memory portion 12 and an on-chip memory portion 13, a CPU 15, a data processing unit 17, and an input/output (I/O) port 18, all interconnected with a system bus. Also included within the memory system 11 is a memory controller 14 for managing memory transactions on the system bus and a DMA controller 16 for performing direct memory access transactions.

FIG. 1B shows a timing diagram of a memory transaction in which a block of data 12A stored in external memory portion 12 is transferred to a smaller memory area in the on-chip memory portion 13 so as to allow the processing unit to process the transferred data and then store the processed data back to external memory or transfer it to another destination. In cycle 0, a first portion of the block of data stored in data block 12A is loaded into the smaller memory area 13A. In cycle 1, data processing unit 7 processes the data, and in cycle 2, the processed data in memory area 13A is either stored out to the external memory portion 12 or to another destination such as I/O ports 18. In cycle 3, a second portion of the block of data 12A is loaded into the on-chip memory area 13A, which is processed in cycle 4, and stored in cycle 5. In cycle 6, more data is loaded into memory area 13A. These cycles (i.e., load, process, store) continue until all of the block of data 12A is processed and stored. The problem with this technique is that during the storing and loading cycles (cycles 2/3, cycles 5/6, etc.) which occur when transferring data into and out of buffer 13A, the processing system is idle, thereby causing a reduction in overall system efficiency.

The present invention is a system and method of performing memory transfers between a larger memory area and a smaller memory area which does not exhibit the memory related latencies as described above.

SUMMARY OF THE INVENTION

The present invention is a system and method of performing memory transactions between a first memory area having a first predefined buffer size and a second memory area having a second predefined buffer size that is smaller than the first buffer size. Instead of performing multiple consecutive transactions between the first memory area and only one buffer area within the smaller memory area, in accordance with the method of the present invention consecutive transactions are alternately performed between the first memory area and at least two predefined memory banks having a combined size that is greater than or equal to the second buffer size.

In one embodiment, a memory bank is defined to be half the size of the second predefined buffer size such that first and second memory banks comprise a single second memory area. Alternatively, a memory bank is defined to be the same size as the second predefined buffer size such that first and second memory banks each comprise one of the second memory areas.

Memory transactions between a buffer in a first memory area and two predefined memory banks A and B in the second memory area occur in the following manner:

1) during a first iteration:
   a first portion of data from the first memory area buffer is loaded into memory bank A;
2) during the next iteration:
   data that was loaded into memory bank A during the first iteration is processed and then stored out to a new destination;
   a next portion of data from the first memory area buffer is loaded into memory bank B;
   the data processing and storing operations are synchronized to ensure operations in this iteration are complete before going to step 3);
3) during the next iteration:
   data that was loaded into memory bank B during the previous iteration is processed and then stored out to a new destination;
   a next portion of data from the first memory area buffer is loaded into memory bank A;
   synchronize operations to ensure completed before going to step 4);
4) during the next iteration:
Repeat steps 2 and 3 until all of the data in the first memory area buffer has been transferred to either memory banks A or B and has been processed such that data is streamed into the two banks without any loading or storing delays when switching from bank to bank.

In accordance with the system and method, the memory transactions are DMA transactions performed using a DMA (direct memory accessing) controller, DMA set-up registers, and DMA stream controller. The DMA controller controls the DMA transactions according to the DMA set-up registers and the DMA stream controller ensures that loading, storing, and processing operations are synchronized. In one embodiment, the DMA set-up registers include a start address in the first memory area, transfer size, bank size, start address in each bank within the second memory area, read/write mode of the second memory area, and status/control information as well as a stream control information.

BRIEF DESCRIPTION OF THE DRAWINGS

The present invention may be further understood from the following written description in conjunction with the appended drawings. In the drawings:

FIG. 2C shows a timing diagram for loading, processing, and storing data when performing DMA streaming using the two memory banks shown in FIG. 2A;

FIGS. 3A–3F show one embodiment of registers used when performing the method of DMA streaming according to the present invention.

DETAILED DESCRIPTION OF THE PREFERRED EMBODIMENTS

The present invention, in general, is a system and method of increasing the efficiency of a data processing system by streaming portions of a large block of data from a large memory area into memory banks in a smaller memory area and performing data processing such that loading and storage times into and out of the memory banks are transparent and data processing is performed in consecutive iterations with minimized idle processing iterations.

Figure 2A:
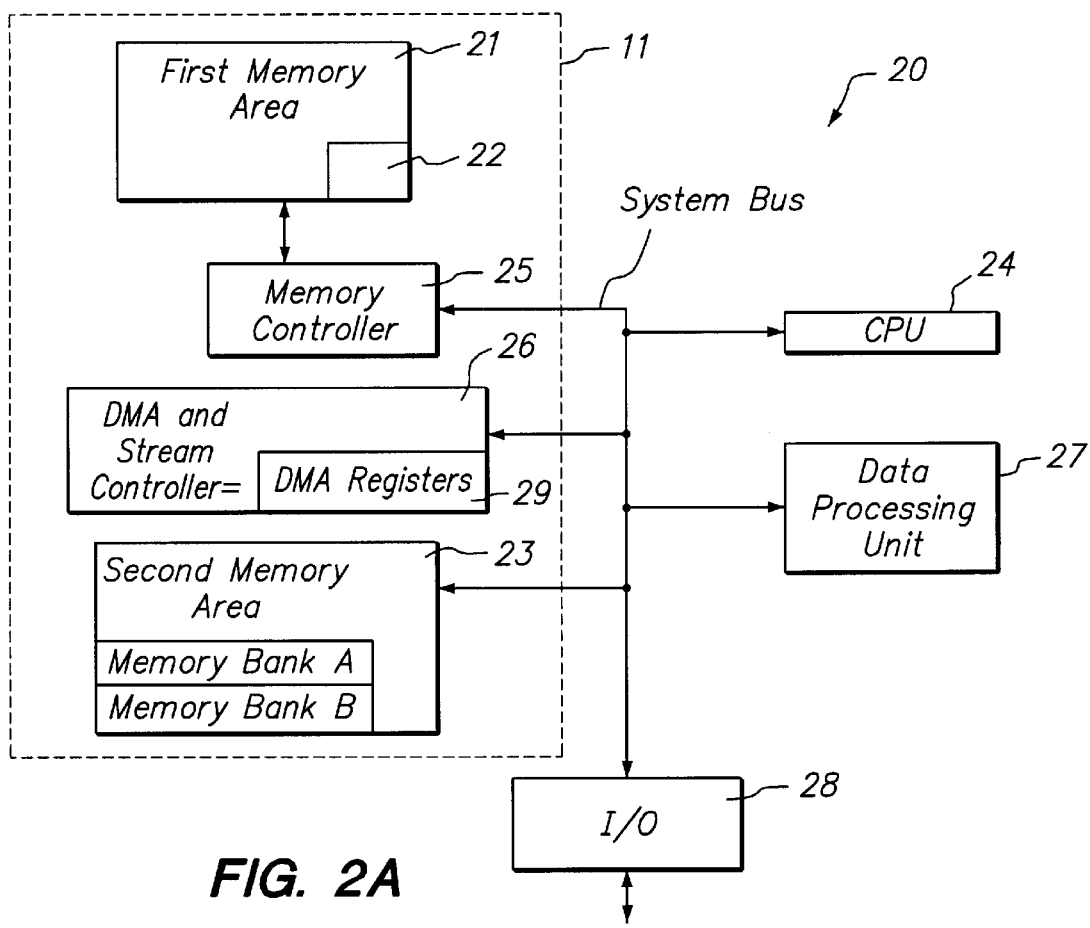
FIG. 2A shows a system for performing DMA streaming using two memory banks in accordance with one embodiment of the method of the present invention.

FIG. 2A shows one embodiment of a system 20 for performing data streaming and processing in accordance with the present invention which includes a first memory area 21 having a data block 22 with an associated first buffer block size and a second memory area 23 having an associated second buffer block size that is smaller than the first buffer block size. The second memory area includes memory bank A and memory bank B. In one embodiment, the size of banks A and B are equal and are each half of the second buffer block size such that banks A and B make up a full second buffer block. Alternatively, each of banks A and B are the same size as the second buffer block size or any multiple of the second buffer block size as long as the size of banks A and B are equal. For instance, each of memory banks A and B can be made up of four of the second buffer blocks.

The system 20 also includes CPU 24 for providing overall system control, memory controller 25 for facilitating memory transactions with first memory area 21, DMA and Stream Controller 26 for controlling direct memory accesses and data streaming within system 20, Data Processing Unit 27 for processing data provided from second memory area 23, and I/O ports 28 for providing a means of inputting and outputting data from system 20.

Figure 2B:
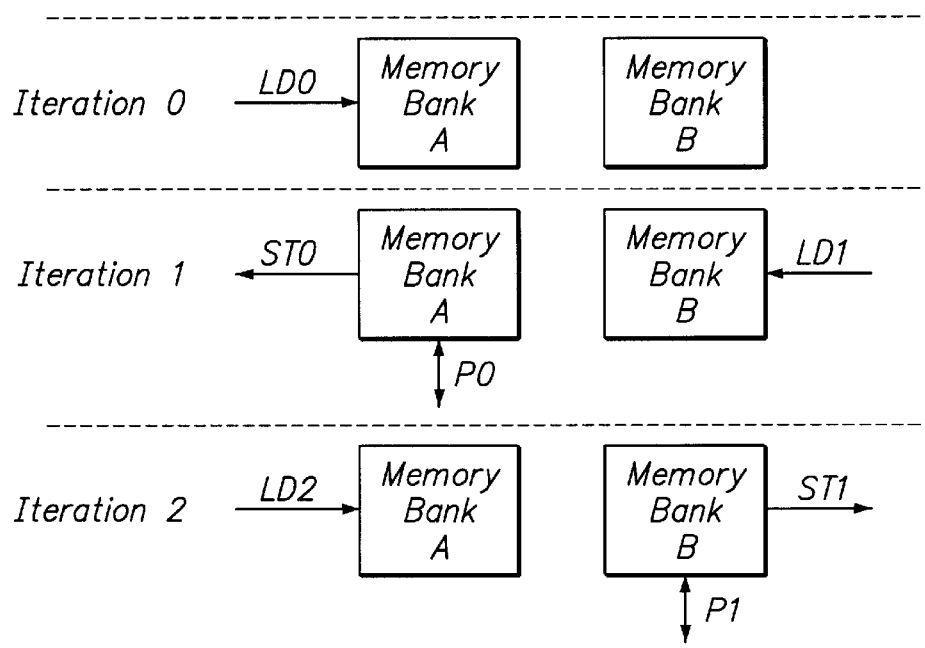
FIG. 2B illustrates one embodiment of the steps of the method of DMA streaming including: loading, processing, and storing data using the system as shown in FIG. 2A.

FIGS. 2B and 2C illustrate the data streaming method and associated timing diagram for performing data streaming with memory banks A and B in the second memory area. As shown in FIG. 2C, prior to each new iteration, memory bank load and store operations are synchronized with data process operations to ensure that any load, process, or store operations are completed prior to starting the new iteration. Referring to FIGS. 2B and 2C, in iteration 0, memory bank A is loaded (LD0) with a first portion of the data from data block 22. In iteration 1, a next portion of data block 22 is loaded (LD1) into memory bank B while the previously loaded portion in memory bank A is processed (P0) and then stored (ST0). In iteration 2, memory bank A is again loaded (LD2) with a third portion of data block 22 while the previously loaded portion in memory bank B is processed (P1) and then stored (ST1). The loading and processing/storing operations continue switching between each memory bank until all of data block 22 is loaded, processed, and stored. As shown in FIG. 2C, ten iteration are used to load, process, and store all of the data in data block 22.

Figure 1A:
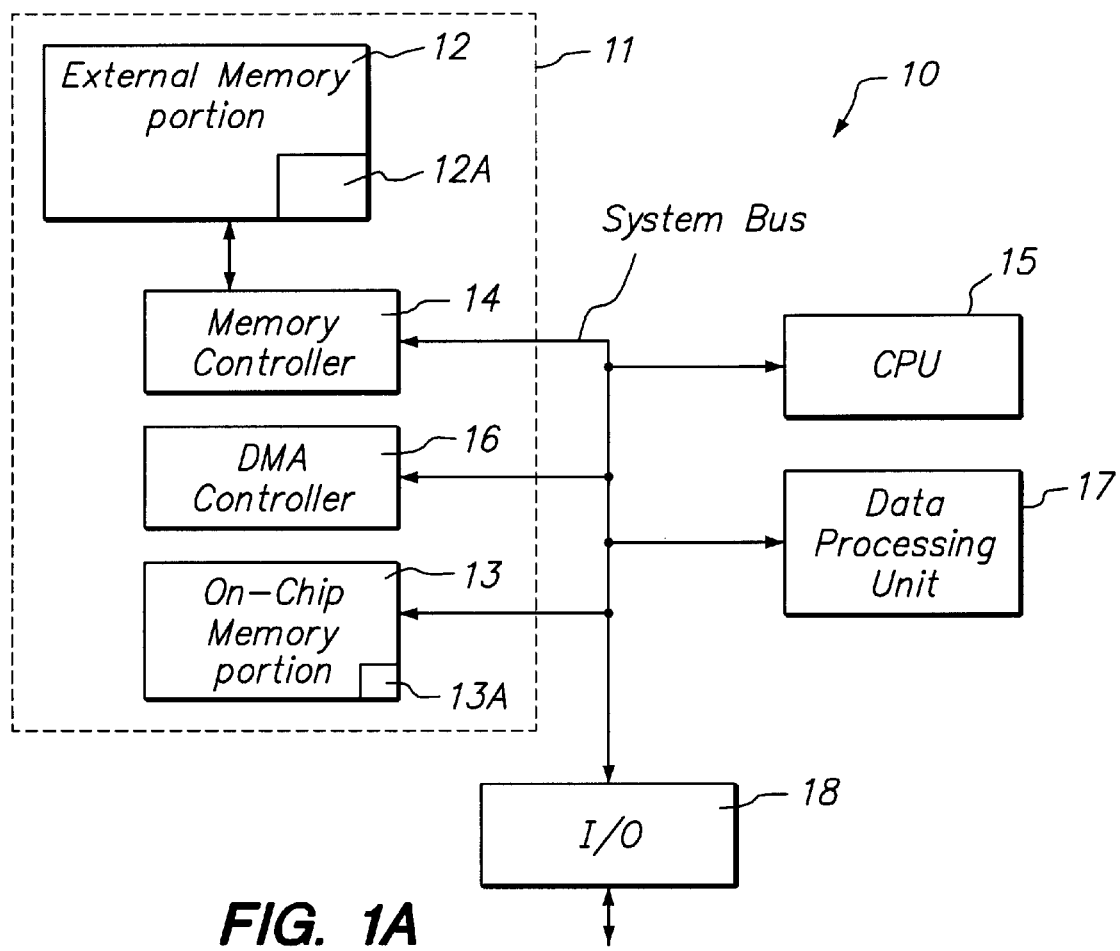
FIG. 1A shows a processing system having a memory system including a large memory area and a smaller internal memory area.
Figure 1B:
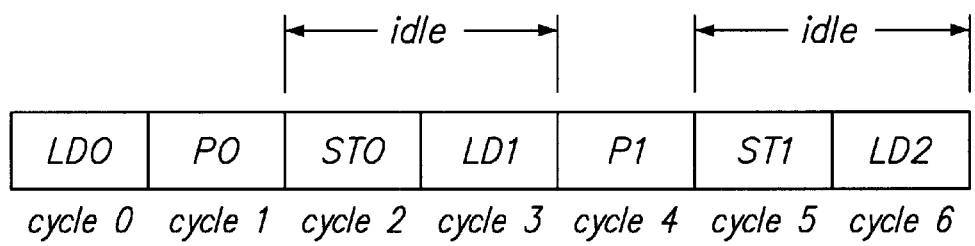
FIG. 1B shows an example of a timing diagram for accessing and processing data using the memory system shown in FIG. 1A.

It should be noted that FIG. 2C illustrates one advantage of the system and method of the present invention wherein during iteration 1–8, the Data Processing Unit 27 is continuously processing data (operations P0–P7) and is not experiencing any idle iterations caused by waiting for load and store operations before and after processing cycles/iterations as shown in the prior art timing diagram, FIG. 1B. Hence, by performing the DMA data streaming technique of the present invention in which portions of a large block of data are being transferred into multiple memory banks in a smaller memory area, processed, and then transferred out of the memory area, a large percentage of the data transfer cycles become transparent.

In accordance with a first embodiment of the present invention, the processed data is stored back to the first memory area 21. In a second embodiment of the present invention, instead of storing the processed data back to the first memory area 21, the processed data is transferred to I/O ports 28 to an external device. In a third embodiment, a large block of data from the I/O ports 28 is streamed into memory banks A and B, processed, and then stored into the first memory area 21.

Synchronization is performed by the DMA and Stream Controller 26. In one embodiment when a given DMA load or store transaction has been completed or when processing of data in one of the banks is complete a flag is set indicating that the action has been completed. The flags are then detected and used by the DMA and Stream Controller 26 to ensure synchronization of the loading and storing and processing of data in each bank in after each iteration.

In one embodiment, the data streaming DMA request which is set-up and initiated by the CPU 24 (FIG. 2A) is implemented with a plurality of smaller sequential DMA load and store transactions coordinated by the DMA and Stream Controller 26. The plurality of sequential DMA load and store transactions function to stream "chunks" or portions of the total block of data into and out of memory banks A and B during the appropriate iterations. The DMA and Streaming Controller 26 then synchronizes the loading, storing, and processing of the plurality of DMA transactions as described above.

Each data streaming DMA transaction is defined by a set of registers as well as flag bits. In one embodiment, the CPU loads the DMA register and flag information into DMA registers 29 which, in the embodiment shown in FIG. 2A, reside within the DMA and Stream Controller 26. Once in the DMA registers 29, a corresponding DMA transaction is entered in a DMA transaction queue (which includes both standard DMA requests and streaming DMA transactions) and waits to become active. At any time, only one streaming DMA transaction or standard DMA request can be active but multiple streaming or standard CPU DMA requests can be queued up. The data streaming DMA transaction remains active until it transfers a predefined block of data (defined by a bank size field within the streaming DMA request register) into one of memory banks A or B, after which it becomes inactive. The address field in the inactive streaming DMA transaction register is then incremented by the predefined bank size and is then re-entered into the queue. When the data streaming DMA transaction becomes active again, it switches to the new bank and continues in the data block 22 where it stopped last time it was active. For instance, if a first portion of data is loaded from block 22 to bank A when the data streaming DMA transaction is active for a first time, the next time the transaction becomes active, loading begins at the end of the first portion into bank B. The DMA transaction continues to be circulated in the queue until a total number of DMA transaction iterations is reached, at which point the streaming DMA request is complete and the DMA transaction is removed from the queue. The number of iterations may be predetermined by the CPU or may be determined by the DMA and Stream Controller 26 utilizing hardware or software by dividing the total size of the block of data to be transferred as initiated by the CPU streaming DMA request divided by the bank size as specified in the CPU DMA request plus additional iterations depending on where the data is loaded from and where it is to be stored to.

In one embodiment, the register and flag bits which define the data streaming DMA request specify 1) a start address in the first memory area 21, 2) a start address in each of banks A and B in the second memory area 23, 3) a stream mode flag bit, 4) a GO flag bit, 5) a stream control register which facilitates tracking the number of iterations between the two banks in streaming mode and which optionally identifies which DMA register sets are used to perform the data streaming. In addition, if both standard and streaming mode DMA requests are performed using the system and method of the present invention, the DMA transaction can be defined by other registers used to implement a standard DMA request unrelated to the DMA streaming mode.

FIGS. 3A–3F show one embodiment of the register and flag bits used to perform a DMA data streaming operation in accordance with one embodiment of the system and method of the present invention. FIG. 3A shows a 32 bit register specifying the start address in memory 21. This address corresponds, for example, to the start address of data block 22 in the first memory area 21. FIG. 3B shows a 32 bit register specifying the start address of a first memory bank (Bank 1 address) and a second memory bank (DMA address). It should be noted that the Bank 1 address register and DMA address register can be used when performing both a data streaming DMA request and a standard DMA request. In the case in which a standard DMA request is performed, only the DMA address is specified. FIG. 3C shows the STREAM and GO flag bits. The STREAM flag bit indicates that memory banks A and B are being used for data streaming and the GO flag bit indicates that the DMA set-up has been completed by the CPU. FIG. 3D shows a 32 bit stream control register including a 10 bit STRMITR field for facilitating the counting of iterations between the two banks when in streaming mode and a 2 bit STRMDMA field specifying a DMA register set (i.e., set 0, set 1, or both). FIG. 3E shows a 32 bit register including a 13 bit BNKSZ (e.g., 128 bytes) field specifying the size of each of banks A and B. FIG. 3F shows a 32 bit register including a single bit RW flag for indicating whether a write or read DMA is to be performed.

According to one embodiment of the method, data streaming is performed by:

1) Setting up a plurality of DMA load and store transactions as follows:
   write the addresses for each of the first memory area, bank A, and bank B in DMA registers;
   write the stream control register to specify which DMA register sets are used (FIG. 3D, STRMDMA field) and the number of iterations (FIG. 3D, STRMITR field); and
   set STREAM bit=1 and GO bit=1.
2) Once the registers are set-up, DMA transactions are performed as they come up in the DMA request queue, are re-entered, and are alternately swapped between each of banks A and B:
3) The streaming operation is complete when the number of iterations between the two banks reaches the value specified in the STRMITR field stream control register.

The total number of DMA transaction iterations that are performed to implement a given streaming DMA request is dependent on where the data is loaded from and where the data is stored to, as well as the total size of the block of data being transferred, and bank size. The following algorithms show the iterative loops performed when transferring n blocks of data 1) from the memory 21, to memory 23, and then back to the memory 21, 2) from the I/O ports 28, to the memory 23, and then to the memory 21, and 3) from the memory 21, to memory 23, and then to the I/O ports 28. One algorithm for performing a streaming DMA request according to case 1) above is shown below:

Do for n+2 iterations:
   If (not last two iterations) perform DMA load transaction;
   If (not first or last iteration) perform processing;
   If (not first two iterations) perform DMA store transaction;
   Synchronize streaming DMAs and data processing unit 27 and swap banks.

It should be noted that n is equal to the total block of data to be transferred from memory 21 as specified by the CPU in the streaming DMA request divided by the bank size. The additional 2 iterations are required to load the first block of data into the first memory bank (A or B) prior to the first processing iteration (e.g., iteration 0, FIG. 2C) and to store the last block of data after the last processing iteration (e.g., iteration 9, FIG. 2C)

In case 2) in which data is streamed from the I/O ports 28, into memory 23, and then stored into memory 21, only one additional iteration is required (i.e., n+1 iterations) and the following algorithm can be used to implement this type of streaming DMA request. Note, in this case no DMA load transactions are required since loading is facilitated by I/O ports 28:

Do for n+1 iterations:
   If (not first iteration) perform DMA store transaction;
   If (not last iteration) perform processing;
   Synchronize streaming DMAs and data processing unit 27 then swap banks.

Similarly, the following algorithm can be used to stream data from the memory 21, to memory 23, and then to the I/O ports 28, requiring n+1 iterations. Note, in this case no DMA store transactions are required since the storing is facilitated by I/O ports 28:

Do for n+1 iterations:
   If (not last iteration) perform DMA load;
   If (not first iteration) perform processing;
   Synchronize streaming DMA and data processing unit 27 then swap banks.

In the preceding description, numerous specific details are set forth, such as specific functional elements or processing system structures in order to provide a thorough understanding of the present invention. It will be apparent, however, to one skilled in the art that these specific details need not be employed to practice the present invention. In other instances, well known processing system operation and theory have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What is claimed is:

1. A system comprising:
   a first memory storage means for storing a block of data, said first memory storage means having an associated first buffer size;
   a second memory storage means having an associated second buffer size and having a first memory bank area and a second memory bank area each having a size at least half that of said second buffer size;
   a means for processing data;
   a first control means for performing direct memory access (DMA) transactions;
   a second control means for synchronizing the operations performed by said processing means and said first control means;
   said first control means and said second control means performing a streaming DMA request including a plurality of consecutive queued DMA transactions such that:
   1) during an initial iteration:
      a portion of data from said block of data is loaded into said first memory bank area;
   2) during a second consecutive iteration:
      said portion of data loaded into said first memory bank area during the previous iteration is processed and then stored out of said second memory storage means;
      a next portion of data from said block of data is loaded into the second memory bank area; and
      said processing means and said first control means are synchronized to ensure processing operations performed by said processing means and DMA transactions are complete;
   3) during a third consecutive iteration:
      data that was loaded into said second memory bank area during said second iteration is processed and then consecutively stored out of said second memory storage means;
      said next portion of data from said block of data is loaded into said first memory bank area; and
      said processing means and said first control means are synchronized to ensure processing operations performed by said processing means and DMA transactions are complete;
   4) subsequent iteration:
      repeat second and third iterations until all of said block of data has been loaded, processed, and consecutively stored out of said second memory storage means.

2. The system as described in claim 1 wherein said plurality of DMA transactions comprises a consecutive DMA load and store transactions.

3. The system as described in claim 2 further comprising a set of registers associated with and defining each of said queued DMA transactions at least including a register indicating a total number of iterations of said consecutive DMA load and store transactions to be performed, a start address of said block of data in said first memory storage means, a start address of said first memory bank area and said second memory bank area in said second memory storage means, and size of said first and second memory bank areas.

4. The system as described in claim 3 further comprising means for tracking a current number of iterations of said consecutive DMA load and store transactions on said first memory bank area and said second memory bank area, a means for re-queuing said consecutive DMA load and store transactions into a DMA transaction queue when said current number of iterations is less that said total number of iterations and for not re-queuing said consecutive DMA load and store transactions into a DMA transaction queue when said current number of iterations is equal to said total number of iterations, wherein said streaming DMA request is complete.

5. A method of performing direct memory accessing between a first memory area and a second memory area comprising the steps of:
   performing, in a first mode, a standard DMA defined by a single DMA transaction wherein a block of data is transferred between said first memory area and said second memory area;
   performing, in a second mode, a streaming data DMA request defined by a plurality of consecutive DMA load and store transactions wherein portions of said block of data stored in said first memory area are, in consecutive iterations, alternately loaded into, processed and stored out of one of a first memory bank area and a second memory bank area in said second memory area until said block of data is completely processed and stored out of said first memory bank area and said second memory bank area.

6. The method as described in claim 5 wherein said step of performing said streaming data DMA request comprises:
   alternately loading portions of said block of data from said first memory area between said first memory bank area and said second memory bank area until said block of data has been completely loaded;
   performing processing iterations on said portions of said block of data;
   alternately storing said processed portions of said block of data until said block of data has been completely stored out of said second memory area.

7. The method as described in claim 5 wherein said step of performing said standard DMA request comprises the steps of:
   a) specifying a single DMA transaction using a register set which at least stores 1) a start address for each of said first memory area and said second memory area and 2) DMA transactions size;
   b) queuing said standard DMA request in a DMA request queue;
   c) activating said standard DMA request dependent on its order in said DMA request queue;
   d) performing said activated standard DMA request wherein a block of data is transferred between said first memory and said second memory.

8. The method as described in claim 7 wherein said step of performing said streaming data DMA request comprises the steps of:
   a) setting up a plurality of streaming data DMA transactions each specifying 1) a start address for said first memory area, a start address for said first memory bank area, and a start address for said second memory bank area 2) memory bank size of said first memory bank area and said second memory bank area each having an equal bank size, 3) total number of iterations dependent on the size of the memory bank area and the size of said data block being transferred;
   b) consecutively queuing said streaming data DMA transactions in said DMA request queue;

c) consecutively activating said streaming data DMA transactions dependent on said streaming data DMA transactions' order in said DMA request queue;

d) incrementing current iteration number for each set of DMA transactions performed;

e) performing said consecutively activated streaming data DMA transactions;

f) re-queuing said streaming data DMA transactions in said DMA request queue if current iteration number is not equal to total iteration number and repeating c)–f) until current iteration number is equal to total iteration number.

9. A system comprising:

a memory having a first memory bank area and a second memory bank area;

a processor; and a streaming DMA controller, the streaming DMA controller adapted to respond to a streaming DMA request including a plurality of consecutive queued DMA transactions such that:

1) during an initial iteration:
a portion of data from the block of data is loaded into the first memory bank area;

2) during a second consecutive iteration:
the portion of data loaded into the first memory bank area during the previous iteration is processed and then stored out of the memory;
a next portion of data from the block of data is loaded into the second memory bank area; and
the processor and the controller are synchronized to ensure processing operations performed by the processor and DMA transactions are complete;

3) during a third consecutive iteration:
data that was loaded into the second memory bank area during the second iteration is processed and then consecutively stored out of the memory;
the next portion of data from the block of data is loaded into the first memory bank area; and
the processor and the controller are synchronized to ensure processing operations performed by the processor and DMA transactions are complete;

4) subsequent iteration:
repeat second and third iterations until all of the block of data has been loaded, processed, and consecutively stored out of the memory.

10. A method comprising, 1) during an initial iteration:
a) a portion of data from a block of data is loaded into a first memory bank area of a memory;

2) during a second consecutive iteration:
a) the portion of data loaded into the first memory bank area during the previous iteration is processed and then stored out of the memory;
b) a next portion of data from the block of data is loaded into a second memory bank area of the memory; and
c) synchronization is done to ensure the processing operation of step 2a and the loading of step 2b are complete;

3) during a third consecutive iteration:
a) data that was loaded into the second memory bank area during the second iteration is processed and then consecutively stored out of the memory;
b) the next portion of data from the block of data is loaded into the first memory bank area; and
c) synchronization is done to ensure the processing operation of step 3a and the loading of step 3b are complete;

4) subsequent iterations:
repeat second and third iterations until all of the block of data has been loaded, processed, and consecutively stored out of the memory.

11. A method including a number of iterations to load and process a block of data, at least some of the iterations comprising:

a) processing the portion of the block of data which was loaded into a bank area of a memory during the previous iteration;

b) loading a next portion of data from the block of data into a bank area of the memory not accessed in the processing step; and c) synchronizing to ensure the processing operation of step a and the loading of step b are complete before doing another iteration.

12. The method of claim 11, wherein the processing step further includes storing the processed data out of the memory and wherein the synchronizing step further ensures that this storing step is complete before doing another iteration.

13. The method of claim 11, wherein the memory has two bank areas and wherein during some iterations processing is done on data in a first bank area while a second bank is loaded and during the next iteration processing is done on data in the second bank area while the first bank area is loaded.

* * * * *